United States Patent
Pelenur et al.

(10) Patent No.: US 8,392,449 B2
(45) Date of Patent: Mar. 5, 2013

(54) RESOURCE SEARCH OPERATIONS

(75) Inventors: Matias Pelenur, Brooklyn, NY (US); Christopher H. Rohrs, New York, NY (US); Samarth Keshava, New York, NY (US); Jeremy Silber, New York, NY (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 12/839,721

(22) Filed: Jul. 20, 2010

(65) Prior Publication Data

US 2011/0137933 A1 Jun. 9, 2011

Related U.S. Application Data

(60) Provisional application No. 61/267,681, filed on Dec. 8, 2009.

(51) Int. Cl.
*G06F 7/00* (2006.01)

(52) U.S. Cl. ........................................ 707/769

(58) Field of Classification Search .......... 707/769, 707/722, 760, 999.003
See application file for complete search history.

(56) References Cited

U.S. PATENT DOCUMENTS

| | | | |
|---|---|---|---|
| 5,991,739 A | 11/1999 | Cupps et al. | |
| 6,418,441 B1 | 7/2002 | Call | |
| 6,763,496 B1 | 7/2004 | Hennings et al. | |
| 6,772,139 B1 | 8/2004 | Smith, III | |
| 6,785,671 B1 | 8/2004 | Bailey et al. | |
| 6,895,430 B1 | 5/2005 | Schneider | |
| 7,143,362 B2 | 11/2006 | Dieberger et al. | |
| 7,404,142 B1 | 7/2008 | Tischer | |
| 7,672,938 B2 * | 3/2010 | Hawkins | 707/709 |
| 7,739,257 B2 * | 6/2010 | Ellis | 707/706 |
| 8,150,824 B2 * | 4/2012 | Marmaros et al. | 707/706 |
| 2002/0099697 A1 | 7/2002 | Jensen-Grey | |
| 2003/0055812 A1 | 3/2003 | Williams et al. | |
| 2003/0097357 A1 | 5/2003 | Ferrari et al. | |
| 2003/0122873 A1 | 7/2003 | Dieberger et al. | |
| 2003/0154221 A1 | 8/2003 | Caronni et al. | |
| 2004/0024788 A1 | 2/2004 | Hill et al. | |
| 2005/0149576 A1 * | 7/2005 | Marmaros et al. | 707/200 |
| 2008/0235209 A1 * | 9/2008 | Rathod et al. | 707/5 |
| 2008/0281810 A1 * | 11/2008 | Smyth et al. | 707/5 |
| 2009/0094249 A1 * | 4/2009 | Hawkins | 707/10 |
| 2009/0112647 A1 * | 4/2009 | Volkert | 705/7 |
| 2009/0198667 A1 * | 8/2009 | Groeneveld et al. | 707/5 |
| 2009/0217168 A1 * | 8/2009 | Dexter et al. | 715/731 |

(Continued)

OTHER PUBLICATIONS

Dieberger A., "Context Lenses—Document Visualization and Navigation Tools for Rapid Access to Detail." Proc. of 8th International Conf. of Human Computer Interactions, Jul. 9-13, 2001, pp. 545-552.

(Continued)

*Primary Examiner* — Mohammed R Uddin
(74) *Attorney, Agent, or Firm* — Fish & Richardson P.C.

(57) ABSTRACT

Methods, systems, and apparatus, including computer programs encoded on a computer storage medium, for identifying query-relevant content in a resource identified by a search result in response to the query. In one aspect, a method includes identifying resource search tidbits for a resource, each resource search tidbit being eligible for a resource search operation for the resource. The resource search tidbits are provided with search results to a client device. In response to a user selecting a resource identified by a search result, the client device identifies text in the resource matching the query-relevant text of the resource search tidbit and performs a resource search operation on the resource if the identified text meets a search operation threshold condition.

20 Claims, 10 Drawing Sheets

U.S. PATENT DOCUMENTS

| | | | | |
|---|---|---|---|---|
| 2010/0161583 A1* | 6/2010 | Sareen et al. | ................. | 707/706 |
| 2010/0205200 A1* | 8/2010 | Hsieh et al. | .................. | 707/765 |
| 2010/0228744 A1* | 9/2010 | Craswell et al. | ............. | 707/751 |
| 2010/0293180 A1* | 11/2010 | Vanderwende et al. | ...... | 707/759 |
| 2011/0060752 A1* | 3/2011 | Lane et al. | ................... | 707/766 |
| 2011/0153595 A1* | 6/2011 | Bernstein et al. | ............ | 707/722 |

OTHER PUBLICATIONS

Examiner's First Report on AU Patent Application No. 2004312923 dated Jun. 17, 2010, 3 pages.

Gronboek et al., "Designing Dexter-based Hypermedia Services from the World Wide Web", Hypertext '97: 8$^{th}$ ACM Conference on Hypertext, Apr. 6, 1997, pp. 146-156, vol. Conf. 8, ACM Conference on Hypertext, New York, US.

International Business Machines Corporation, "Positioning the browser at the answer sentence in a document", Research Disclosure, Mar. 2000, vol. 431, No. 193, Kenneth Mason Publications, Hampshire, GB, IOS Press, Amsterdam, Netherlands.

International Search Report, PCT/US2004/043845, May 5, 2005, 4 pages.

Law in the Outer Limits? Therese O'Donnell, 1997, pp. 1-7.

Lawrence, S. et al., "Context and Page Analysis for Improved Web Search", IEEE Internet Computing, IEEE Service Center, New York, NY, U.S., Aug. 31, 1998, pp. 38-46, XP 002255811.

Leuski A. et al., "iNeATS: interactive multi-document summarization", Annual Meeting of the ACL. Proceedings of the 41st Annual Meeting on Association for Computational Linguistics, ACM, US, Jan. 1, 2003, pp. 125-128, XP 007911213.

Notification of Transmittal of the International Search Report and the Written Opinion of the International Searching Authority, or the Declaration for PCT/US2010/059415, dated Jun. 6, 2011, 13 pages.

* cited by examiner

RESOURCE SEARCH OPERATIONS

CLAIM OF PRIORITY

This application claims priority under 35 USC §119(e) to U.S. patent application Ser. No. 61/267,681, filed on Dec. 8, 2009, the entire disclosure of which is hereby incorporated by reference.

BACKGROUND

This specification relates to digital information retrieval, and particularly to processing search results to facilitate search operations.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search system selects and scores resources based on their relevance to the search query and on their importance relative to other resources to provide search results that link to the selected resources. The search results are typically ordered according to the scores, and provided in a search results page.

The search results page displays a list of search results, and each search result includes several lines of text (a "snippet") that are intended to show how the page is relevant to the query. When a user clicks on a search result, the user's client device requests the resource—typically a web page—that the search result references. When the page is received at the client device, however, the user may have to manually search the page to find the relevant content, even if the snippet included the exact content they want. The users often must either scroll through the page to find the relevant content, or perform a manual word search operation by use of a browser word search tool.

SUMMARY

In general, one innovative aspect of the subject matter described in this specification can be embodied in methods that include the actions of receiving a query, the query including one or more query terms; receiving, for each of a plurality of resources identified as being relevant to the query, one or more tidbits, each tidbit being query-relevant text extracted from the resource; for each tidbit extracted from each resource: determining whether the tidbit is eligible for a resource search operation that occurs in response to the resource being rendered on a client device, and in response to determining that the tidbit is eligible for a resource search operation, marking the tidbit as being a resource search tidbit; and providing, for each of the plurality of resources, a corresponding search result responsive to the query, each search result including a resource locator that specifies the location of the resource, and wherein at least one search result includes a resource search tidbit. Other embodiments of this aspect include corresponding systems, apparatus, and computer programs, configured to perform the actions of the methods, encoded on computer storage devices.

Another aspect of the subject matter described in this specification can be embodied in methods that include the actions of receiving, in response to a query including one or more query terms, a search results page including search results responsive to the query, each search result including a resource locator that specifies the location of a resource identified as being relevant to the query, and wherein at least one search result includes a resource search tidbit, the resource search tidbit being query-relevant text extracted from the resource and eligible for a research search operation in response to the resource specified by the resource locator of the at least one search result being rendered on the client device; receiving a selection of the at least one search result at the client device; receiving, in response to the selection, the resource specified by the resource locator of the at least one search result; rendering the resource at the client device; identifying a portion of text in the resource that matches the query-relevant text of the resource search tidbit; and performing the resource search operation only if the identified portion of the text matching the query-relevant text of the resource search tidbit meets a search operation threshold condition. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
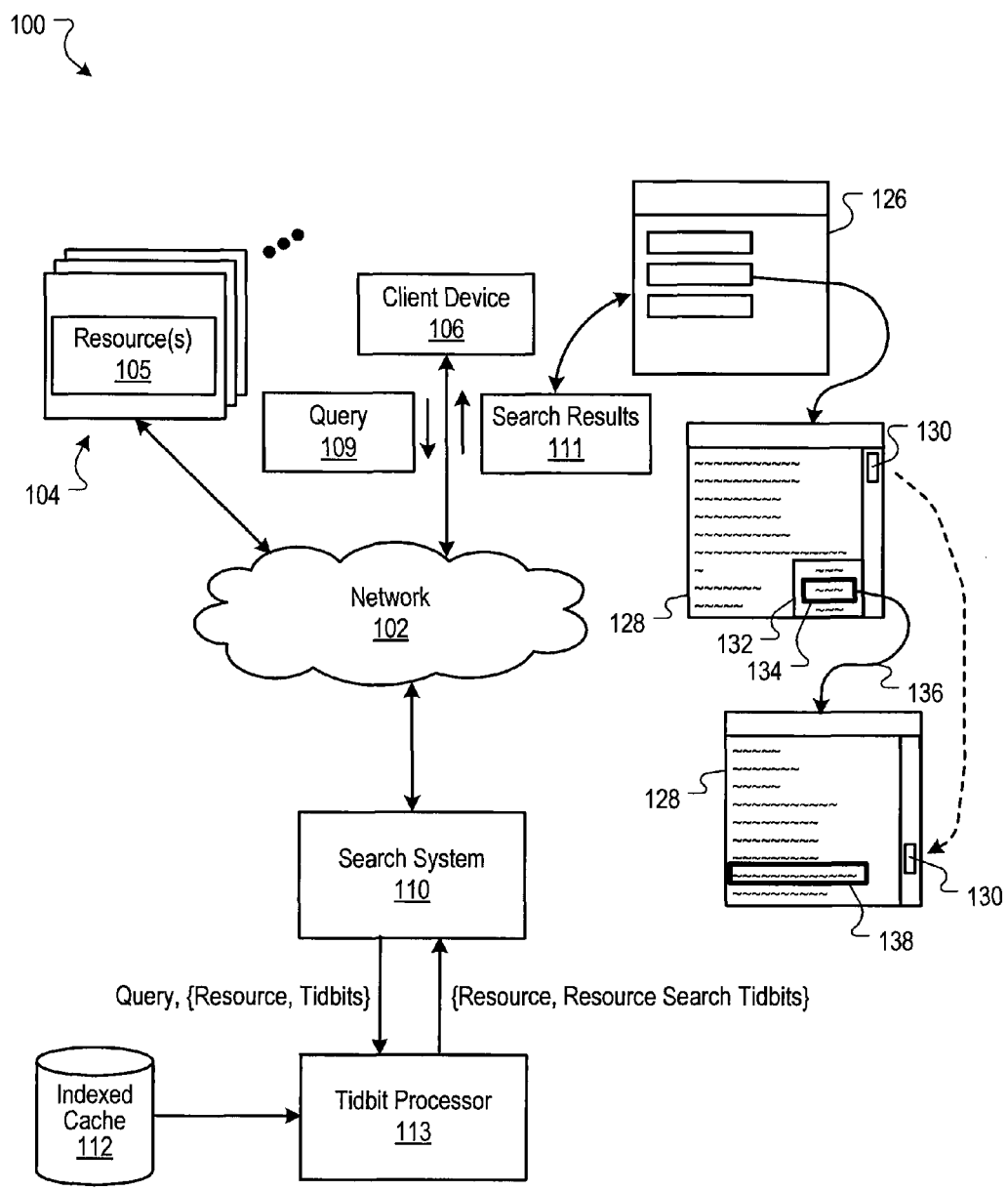
FIG. 1 is a block diagram of a search system that facilitates resource search operations on a client device.

FIG. 1 is a block diagram of a search environment 100 that facilitates resource search operations on a client device. The example environment 100 includes a network 102, e.g., a local area network (LAN), wide area network (WAN), the Internet, or a combination of them. The network 102 connects Websites 104, client devices 106, and the search system 110. The environment 100 may include many thousands of publishers 104 and client devices 106.

A Website 104 is one or more resources 105 associated with a domain name and hosted by one or more servers. An example Website is a collection of Web pages formatted in hypertext markup language (HTML) that can contain text, images, multimedia content, and programming elements, e.g., scripts. Each Website 104 is maintained by a publisher, e.g., an entity that manages and/or owns the Website.

A resource 105 is any data that can be provided by a Website 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A client device 106 is an electronic device that is under control of a user and is capable of requesting and receiving resources 105 over the network 102. Example client devices 106 include personal computers, mobile communication devices, and other devices that can send and receive data over the network 102. A client device 106 typically includes a user application, e.g., a web browser, to facilitate the sending and receiving of data over the network 102.

To facilitate searching of resources 105, the search system 110 identifies the resources 105 by crawling and indexing the resources 105 provided on Websites 104. Data about the resources 105 can be indexed based on the resource to which the data corresponds. The indexed and, optionally, cached copies of the resources 105 are stored in an indexed cache 112.

The client devices 106 submit search queries 109 to the search system 110. For instance, any particular search query 109 can include one or more terms consisting of words, numbers or other characters. As an example, the search query 109 entered by the user can be "pachinko 1975 Japan" to search online for information regarding the Japanese upright pinball games. In response, the search system 110 accesses (e.g., using a search engine) the indexed cache 112 to identify resources 105 that are relevant to the search query 109. The search system 110 identifies the resources 105, generates search results 111 that identify the resources 105, and returns the search results 111 to the client devices 106. For example, the search results 111 can include resources 105 corresponding to Web hits related to "1975 Japanese pachinkos" in response to the user's search query 109. A search result 111 is data generated by the search system 110 that identifies a resource 105 that is responsive to a particular search query, and includes a link to the resource 105. An example search result 111 can include a Web page title, a snippet of text or a portion of an image extracted from the Web page, and the URL of the Web page.

For a search of textual content, the search results are ranked based on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the client device 106 according to the order.

The client devices 106 receive the search results 111, e.g., in the form of one or more search result pages 126, and render the search results 111 for presentation to users. In response to the user selecting a link in a search result 111 at a client device 106, the client device 106 requests the resource 105 identified by the link. The Website 104 hosting the resource 105 receives the request for the resource 105 from the client device 106 and provides the resource 105 to the requesting client device 106.

The search results 111 include the identification of resources 105 that are relevant to the user's search, such as a set of query terms entered by the user into a Web browser on the client device 106. When the resources 105 are identified as relevant to the user's search, the search system 110 identifies one or more tidbits and selects a subset of the tidbits for potential inclusion as a snippet. As used herein, a "tidbit" is query-relevant text that can be included in a snippet. A "snippet" can include one or more tidbits. Each snippet can include query-relevant text extracted from the resource 105 specified by the resource locator (e.g., the resource's URL) of the search result. Snippets can be rendered on the client device 106 as part of the search result. In some implementations, a tidbit is a portion of contiguous text in the resource, such as a group of adjacent words in the search result 111 displayed on the user's client device 106. The search results 111 can also include one or more snippets, each including one or more tidbits.

The search system 110 can provide the query, the resources (or data identifying the resources) and the tidbits for each of the resources to a tidbit processor 113. The tidbit processor 113, which is described in more detail in FIG. 2, determines for each tidbit whether the tidbit is eligible for a resource search operation that occurs in response to the resource being rendered on a client device 106. In response to determining that a particular tidbit is eligible for a resource search operation, the tidbit processor 113 marks the tidbit as a resource search tidbit (RST). The use of resource search tidbits is described in more detail below. For each resource, the tidbit processor 113 informs the search system 110 of the identified resource search tidbits, if any.

Once a search results page 126 is presented to the user, displaying the search results 111, the user can make a selection. For example, the user can review the search results 111, including examining the snippets displayed for each resource 105 corresponding to each individual search result 111. Upon seeing a particular search result of interest, for example, the user can click the URL or other resource locator for the resource 105 to display a page 128 corresponding to the resource 105. The page 128 can be, for example, the rendered resource 105 corresponding to the news story, product review, home page, advertisement, or any other Web page selected by the user from the search results 111. If the information on the page 128 is textual, for example, and does not fit entirely within the viewport of the client device 106, one or more scroll bars 130 within the user interface of the client device 106 can be used to manage the display of the page 128. Upon initial navigation to a page 128, because the first few or "top" paragraphs or sections of the Web site's information are displayed, the scroll bar 130 is scrolled to the top.

Sections of the Web site of most interest to the user (e.g., the Web content portions that correspond to query-relevant tidbits) may not appear in the top, or immediately viewable, portion of the Web page. In other words, the information does not fit entirely within the viewport of the client device 106, or is difficult for the user to find on the screen.

To provide more convenient and faster access to the sections of interest, a selection environment 132 is displayed. The selection environment displays resource search tidbits 134 for the resource, each containing a portion of the query-relevant text of the resource. For example, the selection environment 132 can include one or more resource search tidbits 134 corresponding to text in the resource that matches the user's search terms (e.g., "pachinko 1975 Japan"). The sections of text of most closely matching the user's search terms may be embedded in a portion of the resource 105 that is not initially displayed on the client device 106. Using the selection environment 132, the user can quickly identify and navigate to those corresponding passages of the resource 105. For example, as depicted in FIG. 1, the selection environment 132 includes three user-selectable lines, each a resource search tidbit, the second of which is highlighted to indicate selection by the user.

One advantage of the selection environment 132 is to overcome the problem of limited viewports, such as the viewport on the client device 106. Depending on the web page being displayed and the client device 106, the resource 105 may not be visible to a user of the device because the resource 105 contains too much information to fit entirely within the device's viewport. For example, because of the zoom level of the viewport (e.g., the viewport is zoomed-in), the size of the viewport and/or the dimensions of the web page, not all of the web page's contents can be displayed in the viewport at the same time. For mobile devices, displaying a web page such a scenario is a common occurrence because of the mobile device's relatively small viewport.

The query-relevant text of a resource search tidbit included in the search result can be, in some implementations, a subset of the query-relevant text of the snippet included in the search result. In some implementations, the resource search tidbits are tidbits that need not necessarily be part of the snippet of the search result, meaning that they are not rendered on the client device 106 as part of the search results 111.

Upon selection of a particular resource search tidbit 134 (e.g., the second of three) from the selection environment 132, the state of information displayed in the page 128 can change, as indicated by the arrow 136. In the newly-displayed state of the page 128, the resource 105 has scrolled to the section of page that corresponds to the resource search tidbit selected by the user. Moreover, the query-relevant text 138 associated with the user-selected resource search tidbit 134 is shown highlighted (e.g., highlighted in FIG. 1 by using a box around the text). For example, while the resource 105 may describe "Japan" in general, the query-relevant text that is of interest to the user can be embedded much further down in the document and made more easily locatable using the user-selectable resource search tidbits 134 that are included in the selection environment 132.

Highlighting of query-relevant text can be accomplished using colored highlighting behind the text. In some implementations, "highlighting" can be accomplished by bolding the text, using a different font family, using a different text color, or by various combinations thereof.

Figure 2:
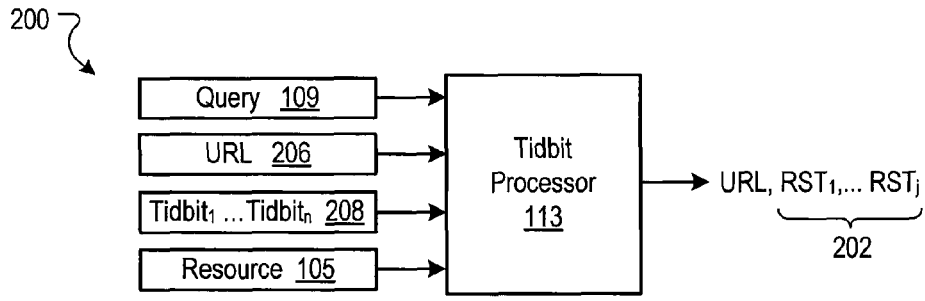
FIG. 2 is a block diagram of an example process flow for identifying resource search tidbits in a tidbit processor.

FIG. 2 is a block diagram of an example process flow 200 for identifying resource search tidbits 202 in the tidbit processor 114. The tidbit processor 113 can be implemented as a component of the search system 110, or can be a separate system in data communication with the search system 110. The resource search tidbits 202 identified by the tidbit processor 113 are called "resource search tidbits." Resource search tidbits are tidbits that are eligible to be used on a client device 106 to search a resource for query-relevant text corresponding to the tidbits as part of a resource search operation. The resource search operations, which is described in more detail below, occurs in response to selecting a search result that identifies the resource.

The tidbit processor 113 receives as input the query 109, a resource URL 206 for each resource identified as being relevant to the query 109, one or more tidbits 208 (e.g., $tidbit_1$ through $tidbit_n$) extracted that the search system 110 has identified as including query-relevant text, and a resource 105 identified by the URL 206 and from which the tidbits 208 are extracted. Depending on these inputs and relationships among them (e.g., comparisons of tidbits with terms in the URL, query terms within the query 109, and portions of titles within the resource 105), the tidbit processor 113 can identify resource search tidbits (RSTs) 202 in addition to the URLs provided to the client device 106 for rendering the resources.

The query 109 can include the one or more user-defined query terms, such as words, numbers, etc. that are input into the search query field of a Web browser executing on the user's client device 106. In some implementations, the search system 110 can generate one or more tidbits 208 that correspond to each resource 105 identified as being responsive to the query 109. Based on the other inputs it receives, the tidbit processor 113 can reduce the list of candidate tidbits 208 to just those tidbits 208 that are appropriate for use as resource search tidbits (RSTs) 202. For example, while several (e.g., several dozen) tidbits related to 1975 Japanese pachinkos can be identified by the search system 110 in response to the query "pachinko 1975 Japan" and provided to the tidbit processor 113, only a handful (e.g., one to ten) may ultimately end up being used to generate resource search tidbits (RSTs) 202. Specifically, the candidate tidbits not used for resource search tidbits (RSTs) 202 can be those eliminated from consideration (e.g., using eligibility rules) by the tidbit processor 113 when comparing the tidbits 208 to the query 109, the URL 206, and the resource 105.

Figure 3A:
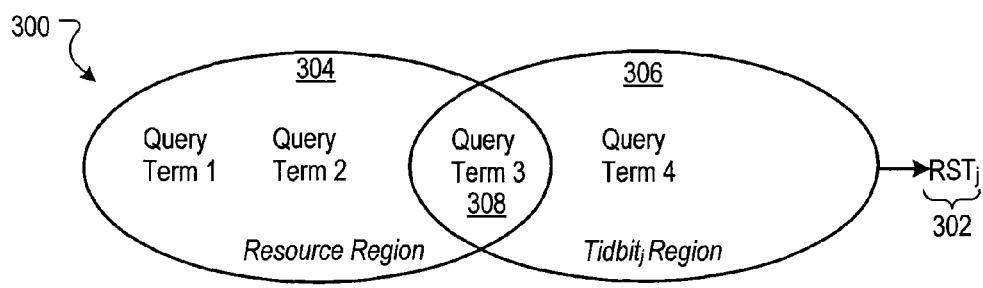
FIGS. 3A-3C are Venn diagrams illustrating an example eligibility rule for determining whether a tidbit is eligible for a resource search operation.
Figure 3B:
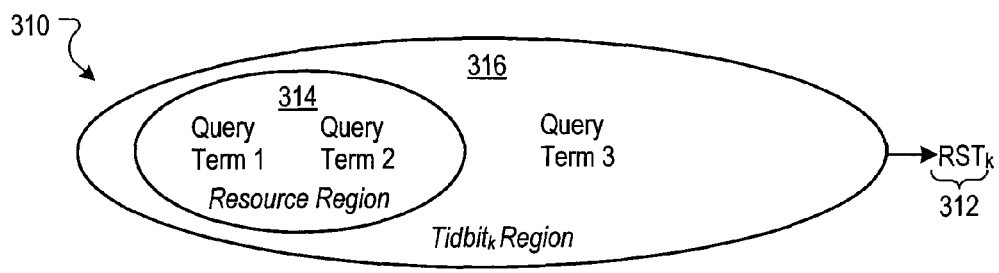
Figure 3C:
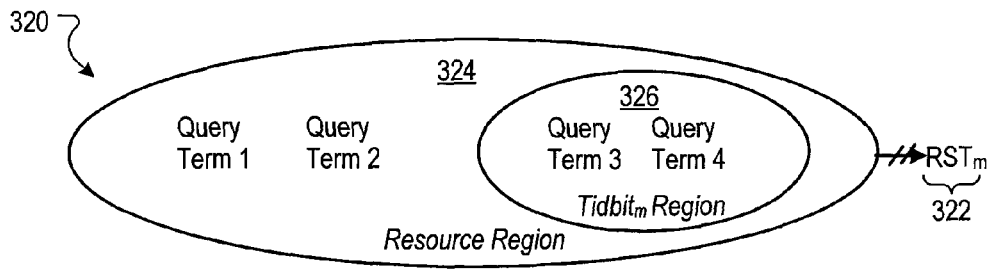

FIGS. 3A-3C are Venn diagrams illustrating an example eligibility rule for determining whether a tidbit is eligible for a resource search operation. The example Venn regions include a resource region and a tidbit region. The resource region is representative of one or more features associated with a resource and the terms that are included in those features. Example features associated with the resource include the URL of the resource, the title of the resource, and even the resource itself. The tidbit region is representative of the terms in the tidbit. In some implementations of using tidbit eligibility rules, if a particular tidbit includes at least one query term that is not included in the title of the resource, then the tidbit can be used as a resource search tidbit (RST). In other implementations, if a particular tidbit includes at least one query term that is not included in the title of the resource or in the resource locator (e.g., URL) of the resource, then the tidbit can be used as a resource search tidbit (RST). Other eligibility rules can also be used, such as rules that take into account the display formatting of query terms in the resource, etc.

In some implementations, rules can also be based on the use of word variants, synonyms, or edit distances. For example, word variants (or words based on word stems) such as "features" and "featured" can trigger a match condition. Synonym matching, when used in tidbit eligibility rules, can include synonym pairs such as "Eisenhower" and "Ike," "Bill Clinton" and "President Clinton," or "green" and "environmental." In some implementations, synonym matching can depend on the context (e.g., other text in the resource), such as to avoid false matches, for example, of the color green versus the "green" (environmental) movement. Edit distances can measure, for example, the relative number of individual character edits required to change Word A into Word B, and in a sense can be similar to word stemming.

Referring to FIG. 3A, Venn diagram 300 illustrates the use of an example eligibility rule that results in the selection of a resource search tidbit$_j$ (RST$_j$) 302. In this example, a resource region 304 within the Venn diagram includes query terms 1, 2 and 3, meaning that the query terms 1, 2 and 3 are included in the one or more features represented by the region 304, e.g., the resource's title, URL or both. A tidbit$_j$ region 306 includes query terms 3 and 4, meaning that the query terms 3 and 4 are included in the tidbit$_j$. The overlap of the regions 304 and 306 is indicated by the intersection 308 that includes the query term 3 that occurs both in the resource feature(s) (e.g., the title and/or URL) and in the tidbit$_j$. In this example, because at least one query term (e.g., the query term 4) is not included in the resource, the tidbit is deemed eligible for being a resource search tidbit (e.g., the RST$_j$ 302).

Referring to FIG. 3B, Venn diagram 310 illustrates the use of an example eligibility rule that results in the selection of a resource search tidbit$_k$ (RST$_k$) 312. In this example, a resource region 314 within the Venn diagram includes query terms 1 and 2, meaning that the query terms 1 and 2 are included in the one or more features represented by the region 304, e.g., the resource's title, URL or both. A tidbit$_k$ region 316 includes query term 3, meaning that the query term 3 is included in the tidbit$_k$. The overlap of the regions 314 and 316 is the region 314 itself, as query terms 1 and 2 occur both in the resource feature(s) (e.g., the resource's title and/or URL) and in the tidbit$_k$. In this example, because at least one query term (e.g., the query term 3) is not included in the resource, the tidbit is deemed eligible for being a resource search tidbit (e.g., the RST$_k$ 312).

Referring to FIG. 3C, Venn diagram 320 illustrates the use of an example eligibility rule that results in not selecting a resource search tidbit$_m$ (RST$_m$) 322. In this example, a resource region 324 within the Venn diagram includes query terms 1, 2, 3 and 4, meaning that the query terms 1, 2, 3 and 4 are included in the features represented by the region 304, e.g., the resource's title, URL or both. A tidbit$_m$ region 326 includes query terms 3 and 4, meaning that the query terms 3 and 4 are included in the tidbit$_m$. The overlap of the regions 314 and 316 is the region 314 itself, as query terms 3 and 4 occur both in the resource feature(s) (e.g., the title and/or URL) and in the tidbit$_m$. However, in this example, because no query terms included in the tidbit$_m$ are absent from the resource feature(s), the tidbit is not eligible for being a resource search tidbit (e.g., the RST$_m$ 322). As a result, the tidbit fails to meet eligibility requirements, for example, for being included in the selection environment 132 described with reference to FIG. 1. In some implementations, determining whether a tidbit is eligible for a resource search operation can result when all of the query terms are included in the tidbit.

Figure 4:
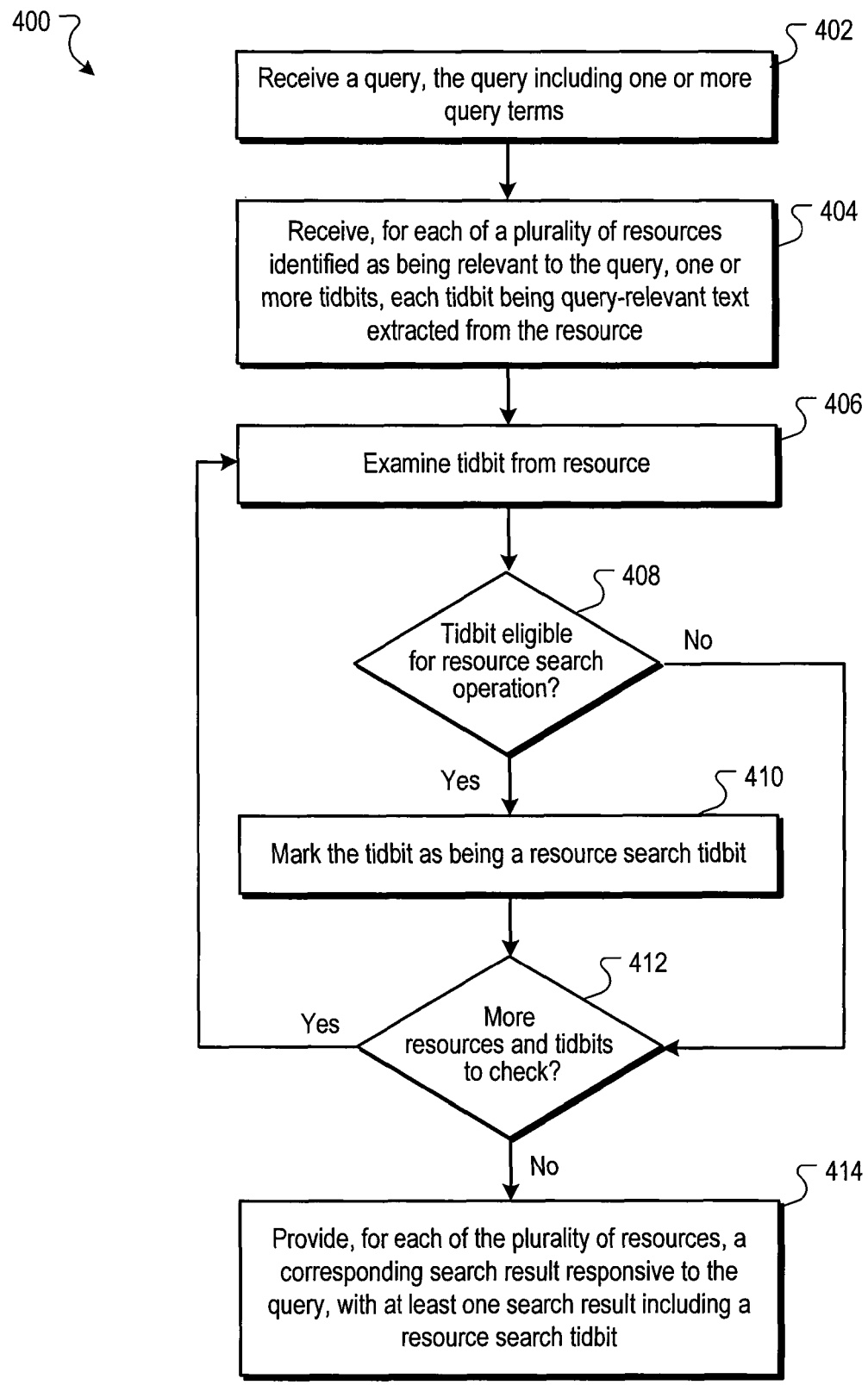
FIG. 4 is a flow diagram of an example process for identifying resource search tidbits.

FIG. 4 is a flow diagram of an example process 400 for identifying resource search tidbits. The tidbit processor 113, for example, can perform the steps of the process 400.

A query that includes one or more query terms is received (402). As an example, the tidbit processor 113 can receive the query 109, which can originate from the client device 106. For example, a user can enter the query terms (e.g., "pachinko 1975 Japan") of the query 109 in a search box of a Web browser or other user application.

For each of a plurality of resources identified as being relevant to the query, one or more tidbits are received, each tidbit being query-relevant text extracted from the resource (404). As an example, the tidbit processor 113 can receive the tidbits 208 from the search system 110, which can automatically send one or more tidbits with any resource that is responsive to the query processed by the search system 110. If the query 109, for example, is "pachinko 1975 Japan," then the tidbits 208 can be query-relevant text extracted from resources 105 (e.g., Web pages) that correspond to the query 109 entered by the user on the client device 106. For instance, example tidbits 208 can include "in 1975, tens of thousands of Japanese pachinkos were replaced . . . " or "Japan sent boatloads of reconditioned pachinkos to the US in 1975," to name a few examples.

The tidbit from the resource is examined (406). Examination can include, for example, text in the tidbit 208 to determine if query terms within the tidbit 208 are contained in the title of the resource 105 and/or embedded within the resource's resource locator (e.g., the resource's URL).

A determination is made whether the tidbit is eligible for a resource search operation (408). For instance, the tidbit processor 113 determines a tidbit 208 to be eligible for a resource search operation if, for example, at least one query term in the tidbit 208 is not contained in the resource 105 title and/or URL.

If the tidbit is eligible for a resource search operation, then the tidbit is marked as being a resource search tidbit (410). For example, the tidbit 208 (e.g., "in 1975, tens of thousands of Japanese pachinkos were replaced . . . ") is marked as a resource search tidbit. As shown in FIG. 2, the "marking" can occur when the tidbit processor 113 outputs or otherwise identifies the tidbit 208 as a resource search tidbit (RST) 202.

A determination is made whether more resources and tidbits remain to be processed (412). For instance, the tidbit processor 113 can process multiple tidbits 208 for each or multiple resources 105.

In some implementations, when the search system 110 identifies a significant number of resources 105 in response to the query 109, the tidbits 208 provided by the search system 110 can be limited initially to only those tidbits 208 that correspond to a subset of the resources, such as only those resources on the first page of search results. Later, if the user begins reviewing search results on a subsequent page, the search system 110 can provide tidbits 208 for additional resources 105, as needed.

For each of the plurality of resources, a corresponding search result responsive to the query is provided, with at least one search result including a resource search tidbit (414). At least one search result includes a resource search tidbit when at least one resource search tidbit is identified as being eligible for a resource search operation. For example, for each resource 105, the search system 110 can provide a search result 109. If the resource search tidbit 202 is, for example, part of the snippet of the search result, the resource search tidbit can be marked by use of HTML <span> tags. Other ways of marking a resource search tidbit can also be used.

Figure 5:
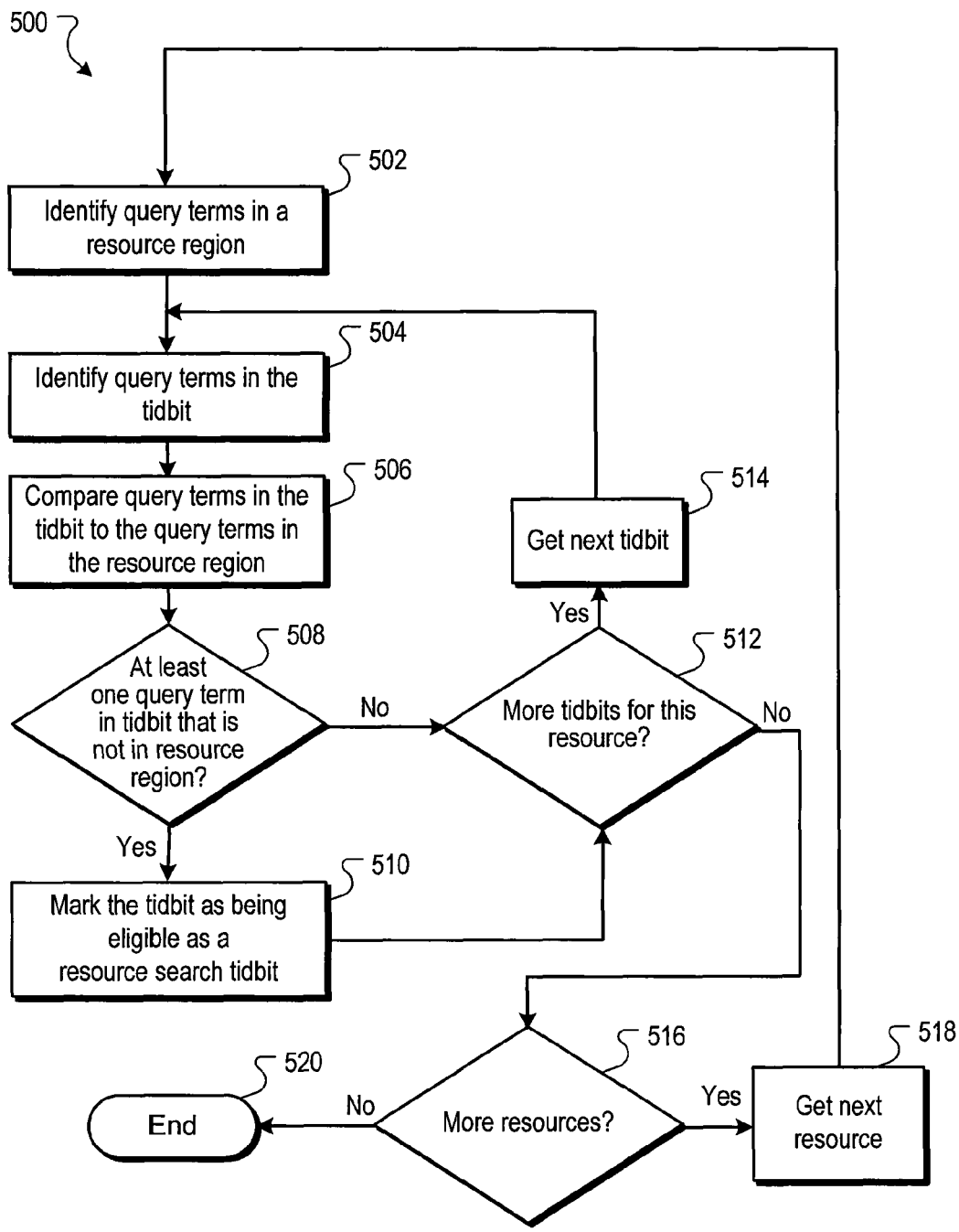
FIG. 5 is a flow diagram of an example process for determining whether a tidbit for a resource is eligible for a resource search operation.

FIG. 5 is a flow diagram of an example process 500 for determining whether a tidbit for a resource is eligible for a resource search operation. The tidbit processor 113, for example, can perform the steps of the process 500.

Query terms in a resource region are identified (502). The resource region can include the resource itself, and/or specific portions of the resource, and/or the URL of the resource, and/or other features of the resource. For example, a resource 105 related to pachinkos can include one or more titles and subtitles within the text of the resource, and can be identified by a corresponding URL. Individual query terms from the user's query 109 can be identified in the title section, and/or the URL of the resource.

Query terms in the tidbit are identified (504). In some implementations, the query terms identified in the tidbit (e.g., one of the tidbits 208) can already have been tagged by the search system 110. If not, the query terms in the tidbit can be identified with reference to those query terms in the query 109.

Query terms in the tidbit are compared to query terms in the resource region (506). In some implementations, synonyms can be used to match query terms to the title section, such as "Ike" (e.g., as a query term) for "Eisenhower" (e.g., as a word in the title section) to name one example. Other term matching techniques can use word stems, such as to match "Japan" with "Japanese" or "featured" with "features" to name a few examples. In some implementations, query terms can also be compared to the resource locator (e.g., URL).

A determination is made whether at least one query term exists in the tidbit that is not in the resource region (508). For example, in some implementations of using eligibility rules for generating resource search tidbits (RSTs) 202, an RST will not be created unless at least one query term (e.g., from the query 109) is absent from the corresponding resource 105. Specifically, an RST 202 is eligible to be created if the tidbit 208 includes at least one query term that is not in the title section or the resource locator (e.g., URL) of the resource 105. In the current example, an RST 202 can be created by the tidbit processor 113 if a pachinko-related resource does not "include" all of "pachinko 1975 Japan" somewhere in the resource's title section and/or URL. Again, in some implementations, "including" can include query term matching using synonyms, word stemming and edit distances.

If at least one query term exists in the tidbit that is not in the resource region, then the tidbit is marked as being eligible as a resource search tidbit (510). For example, the tidbit processor 113, after comparing one of the tidbits 208 with the title section of the resource 105, can output the tidbit 208 as a resource search tidbit (RST) 202. Generation of the RST 208 can include the tidbit itself plus any additional information needed to place the RST 208 in the selection environment 132 and to enable ultimate selection of the RST 208 by the user and navigation to the corresponding query-relevant text portion in the resource 105.

A determination is made whether more tidbits for the current resource remain to be processed (512). For example, a resource 105 can have more than one tidbit 208 provided for it, and the tidbit processor 113 can process all of the tidbits for the resource to determine which tidbits 208, if any, are candidates for becoming eligible for becoming resource search tidbits (RSTs) 202.

In some implementations, the tidbit processor 113 can stop processing tidbits 208 for a resource 105 when a threshold number (e.g., five RSTs 202) have been identified, so as not to overwhelm the user with too many RSTs 202 in a selection environment of a resource search operation. In some implementations, all tidbits 208 for a resource 105 can be processed by the tidbit processor 113, and the best RSTs 202 can be provided to the user, discarding, for example, RSTs 202 of lower quality as determined by a ranking algorithm. In some implementations, the tidbit processor 113 can generate at least one RST 113 even if not all of the query terms are exact matches to query-relevant text within the resource 105 in order to have at least one RST 113 that the user can use.

If more tidbits for the current resource remain to be processed, then the next tidbit is obtained (514). Processing the next tidbit can resume at step (504) of the process 500. For example, query terms in the tidbit are identified (504), and so on for the next tidbit and for each tidbit processed.

A determination is made whether more resources remain to be processed (516). For example, in response to the query 109, the search system 110 can provide multiple resources 105. The tidbit processor 113 can process each of the resources 105 and their tidbits 208 in order to determine RSTs 202.

If more resources remain to be processed, then the next resource is obtained (518), and processing the next resource can resume at step (502) of the process 500. When all resources 105 have been processed by the tidbit processor 113, the process 500 ends (520).

Figure 6:
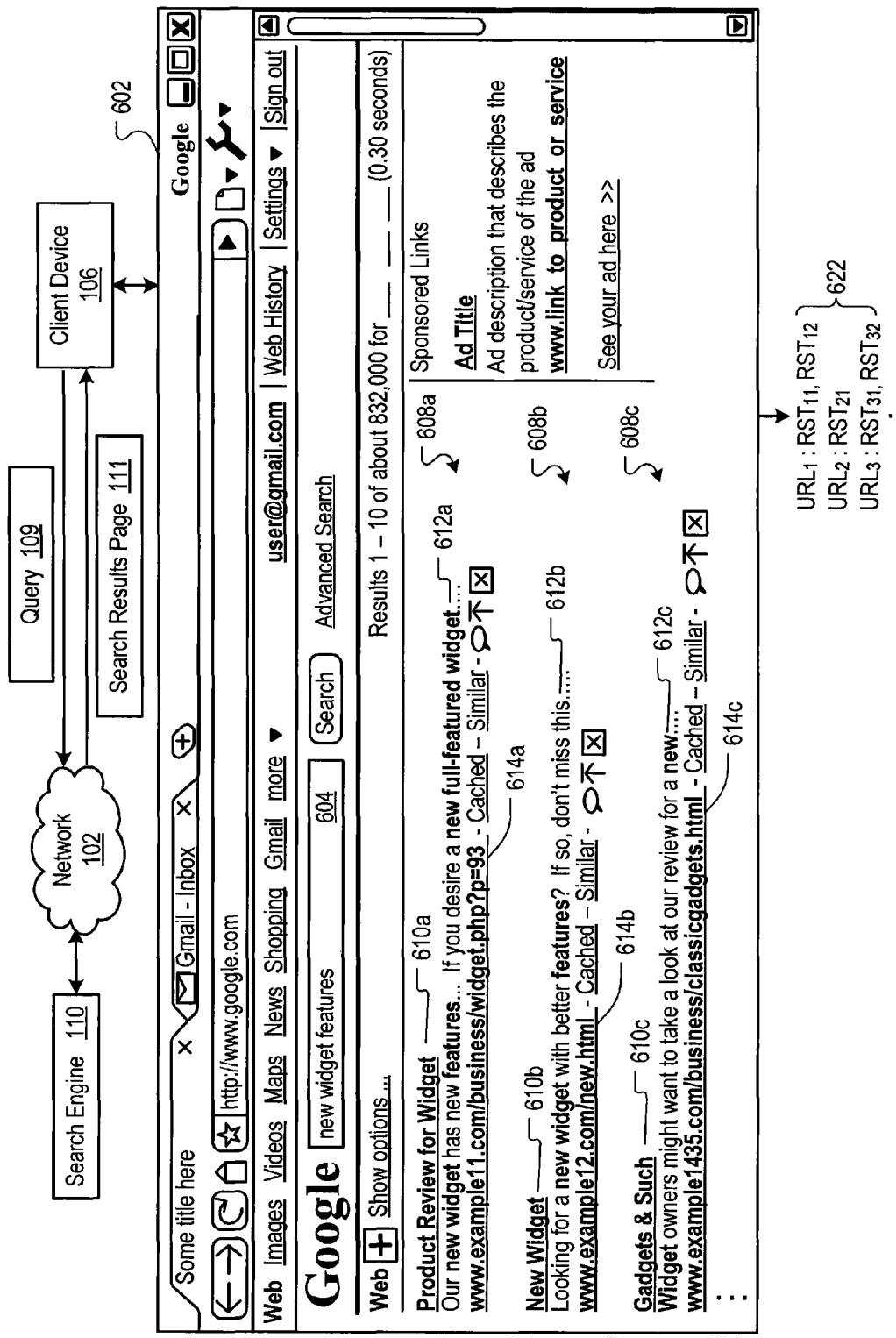
FIG. 6 is a block diagram of an example process for associating resource search tidbits with resource locators from a search results page.

FIG. 6 is a block diagram of an example process for associating resource search tidbits with resource locators from a search results page. An example search results page 602 lists search results 608a-608c that correspond to a search query 604. For example, a user running a Web browser on the client device 106 can enter the search query 604 (e.g., "new widget features") in order to access Internet information related to widgets having new features. The client device 106 can send the query 109 (e.g., including query terms from the user's search query 604) over the network 102, where it can be handled by a search system 110. In response to the query 109, the search system 110 can return the search results 111.

On the search results page 602, the search results 111 can be displayed as the individual search results 608a-608c. These search results 608a-608c correspond to the resources 105 described with reference to FIG. 1. In the search result 608a, a resource title 610a (e.g., "Product Review for Widget") provides a title-level description of the search result 608a. In this case, the resource title 610a also includes one of the query terms of the search query 604, namely "Widget." The search result 608a also includes a snippet 612a of "Our new widget has new features . . . . If you desire a new full-featured widget . . . " in which the query terms, or likenesses thereof, are bolded. For example, the likenesses of the query terms of the search query 604 can include synonyms, word stems or variants (e.g., "full-featured"), and words within a threshold edit distance. The search result 608a further includes a resource locator 614a, in this case the URL "www.example11.com/business/widget.php?p=93" that can be used to access the resource 105. As an example, the user can click on the URL to navigate to the web page associated with the resource locator 614a.

The other search results on the search results page 602, namely the search results 608b and 608c each have their respective titles 610b and 610c, snippets 612b and 612c, and resource locators 614b and 614c. Within the snippets 612b and 612c, terms in the snippets that "match" the query terms of the search query 604 are also bolded. In some implementations, words in titles, snippets and resource locators can be highlighted in various ways, such as with different colors of highlighting (e.g., a different color for each query term), shading, different font colors, different font families, bolding, italics, or any other mechanism for providing a different visible look to the user. In some implementations, hovering over, or clicking on, a query term can cause all instances of that query term to be highlighted in some way.

Resource search tidbit information 622, which identifies resource search tidbits for each search result 608, is also provided with the search results page. The resource search tidbit information 622 need not be displayed as part of the page; instead, the information can be of the form of marked resource search tidbits for each search result. For example, a resource search tidbit can be query-relevant text that is independent of the query-relevant text of a snippet for a search result, i.e., the resource search tidbit may be a block of text that is not part of the snippet.

For instance, the resource search tidbit information 622 can include, for each search result (e.g., search results 608a-608c), the search result's resource locator (e.g., URL) and associated resource search tidbit. For the search result 608a, the Web browser executing on the client device 106 can process, in response to a selection of the search result 608a, the two resource search tidbit (as indicated by "URL$_1$: RST$_{11}$, RST$_{12}$") to determine whether a resource search operation is to be performed.

In some implementations, the associations between resource search tidbits and resource locators can be stored, for example, by processing a document object model (DOM) representation of the search results page. Web browser applications can use various internal representations of the document, such as a document object model (DOM) representation, for managing and rendering documents to be displayed to the user. Any of the representations can be used, for example, to associate resource locators (e.g., URLs) with resource search tidbits (RSTs), such as will be described with respect to the process flow diagram FIG. 11.

The Web browser's rendering module (e.g., part of the Web browser executing on the user's client device 106) can translate a displayed markup language document using some type of translation, such as to a DOM representation. The translation can analyze the internal representation of the current document, extract text from the text nodes of the representation, and send the text to a browser translation module for translation. The page translator module can receive the translated text from the browser translator module and updates the internal representation. The rendering component of the browser can then render the updated internal representation. In general, the term "web browser" when used herein can refer to any web browser application, any browser extension, or any other program running on the client (or server) that facilitates browsing online content.

The DOM representation of a document is in the form a tree of node objects. Each node corresponds to a part of the document. Nodes can be various types including, for example, root nodes, element nodes, attribute nodes, text nodes and script nodes. A text node is a node corresponding to text in the document, and includes text stored in the node. An element node is a node corresponding to an annotation in the document such as <html> tags or <title> tags. An attribute node is a node corresponding to an attribute of an element node, such as the source for an <image> tag. A script node includes an executable script. A DOM representation can also include other types of nodes.

By traversing the DOM of the search results page, the browser identifies the resource search tidbits that have been marked for each URL and stores the association in memory. The association is then accessed each time a page is requested by a selection of a search result, and the web browser uses the association to determine which resource search tidbits to search for in a given page. Using the resource search tidbits for the page, the web browser determines whether the resource search tidbits meet a resource search operation threshold condition.

Figure 7A:
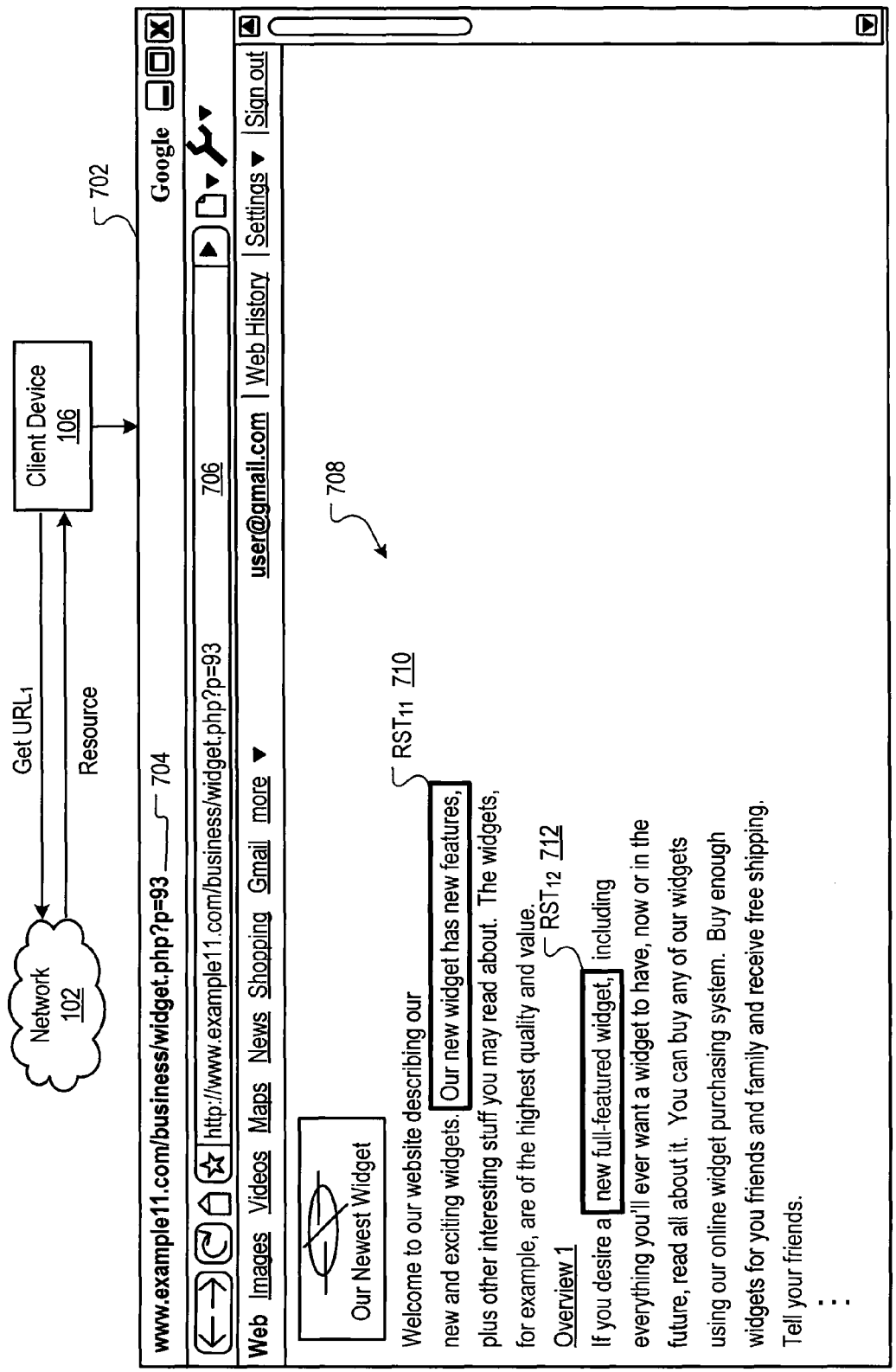
FIG. 7A is an illustration of an example rendering of a resource for which a portion of text matching the query-relevant text of the resource search tidbit does not meet a search operation threshold condition.

FIG. 7A is an illustration of an example rendering of a resource for which a portion of text matching the query-relevant text of the resource search tidbit does not meet a search operation threshold condition. The rendering shows an example page 702. For instance, the page 702 displayed represents an example Web Page that can be rendered if the user selects the search result 608a, as described with reference to FIG. 6. Both the Web page title 704 and the address 706 match the resource locator 614a (e.g., "www.example11.com/business/widget.php?p=93"). To obtain the resource information needed to render the webpage 702, communication by the client device 106 across the network 102 (e.g., an HTTP get) involves requesting the resource associated with the resource locator 614a.

The page 702 can be rendered, for example, by a Web browser executing on the user's client device 106. When the page 702 is rendered, the Web page content 708 is displayed, including any graphics and text associated with the resource. Query-relevant text may or may not be highlighted, and if so, the highlighted text passages 710 and 712 correspond to the resource search tidbits (e.g., "RST$_{11}$ and RST$_{12}$") that are included in the resource search tidbit information 622 and correspond to the resource locator 614a (e.g., the URL "www.example11.com/business/widget.php?p=93"). The Web browser on the client device 106 can have the ability to highlight the query-relevant text associated with the resource search tidbits if, for example, the associations between the resource locator (e.g., the resource's URL) and the resource search tidbits are accessible from document object models (DOMs) from the previous search results page stored in computer memory. In this example, the page 702 does not include a selection environment 132 because, in this example, the query-relevant text associated with resource search tidbits (e.g., "RST$_{11}$ and RST$_{12}$") are near enough to the "top" of the Web page content 708 (e.g., above the "fold") so as not to warrant displaying a control that allows the user to quickly navigate significantly "lower" on the Web page.

Figure 7B:
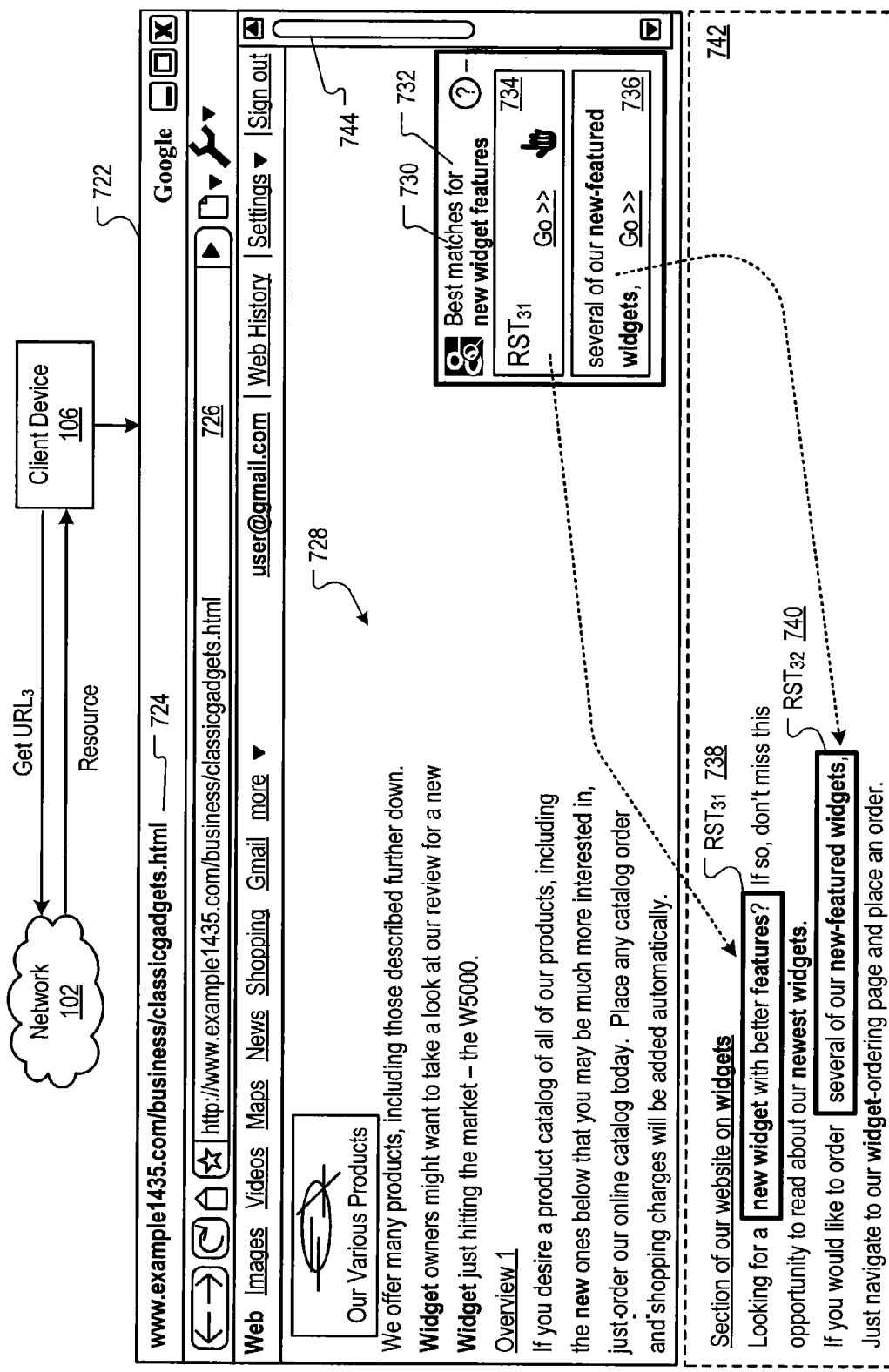
FIG. 7B is an illustration of an example rendering of a resource for which a portion of text matching the query-relevant text of the resource search tidbit does meet a search operation threshold condition.

FIG. 7B is an illustration of an example rendering of a resource for which a portion of text matching the query-relevant text of the resource search tidbit does meet a search operation threshold condition. The rendering is of an example page 722. For instance, the page 722 displayed represents an example Web Page that can be rendered if the user selects the search result 608c, as described with reference to FIG. 6. Specifically, both the Web page title 724 and the address 726 match the resource locator 614c (e.g., "www.example1435.com/business/classicgadgets.html").

To obtain the resource information needed to render the webpage 722, communication by the client device 106 across the network 102 (e.g., "Get URL$_3$") involves requesting the resource associated with the resource locator 614c.

The page 722 can be rendered, for example, by a Web browser executing on the user's client device 106. When the page 722 is rendered, the Web page content 728 is displayed, including any graphics and text associated with the resource.

In this example, the text corresponding to the resource search tidbits associated with the resource are positioned sufficiently lower within the content of the Web page so as not to be displayed when the Web page appears. Essentially, the text of the resource search tidbits are scrolled off the page. However, the browser executing on the client device 106, for example, can recognize the rendered location of the query-relevant text and automatically display a selection environment 730. A best matches message 732 included in the selection environment 730 can echo the query terms (e.g., "new widget features") that are included in the user's original search query 604, as described with reference to FIG. 6. The selection environment 730 can further include the resource search tidbits (e.g., "RST$_{31}$ and RST$_{32}$") associated with the query-relevant text passages, in this case selection environment options 734 and 736. Specifically, the option 734 can be selected by the user to navigate to the portion of the web content containing the text 738 matching the resource search tidbit RST$_{31}$, and the option 736 to navigate to the text 740 matching the resource search tidbit RST$_{32}$. The option 734 is depicted in FIG. 7B as containing the text "RST$_{32}$" in order to make clear the mapping of the RST to its corresponding query-relevant text in the resource. However, the option 736 includes the tidbit "several of our new-featured widgets" which matches the query-relevant passage 740. In some implementations, including the one depicted in FIG. 7B, query terms that appear in tidbits and query-relevant text can be highlighted in any way (e.g., shown here using bolding).

In this example depiction of the web page 722, the query-relevant passages 738 and 740 are displayed in a phantom region 742 used here to indicate and extension of the web page 722 beyond the active viewport.

The query-relevant text is highlighted, and the text passages 710 and 712 correspond to the resource search tidbits (e.g., "$RST_{31}$ and $RST_{32}$") that are included in the resource search tidbit information 622 and correspond to the resource locator 614$a$ (e.g., the URL "www.example11.com/business/widget.php?p=93"). The Web browser on the client device 106 has accesses associations between the resource locator (e.g., the resource's URL) and the resource search tidbits are accessible from data gathered from document object model (DOM) and stored in computer memory.

Figure 8:
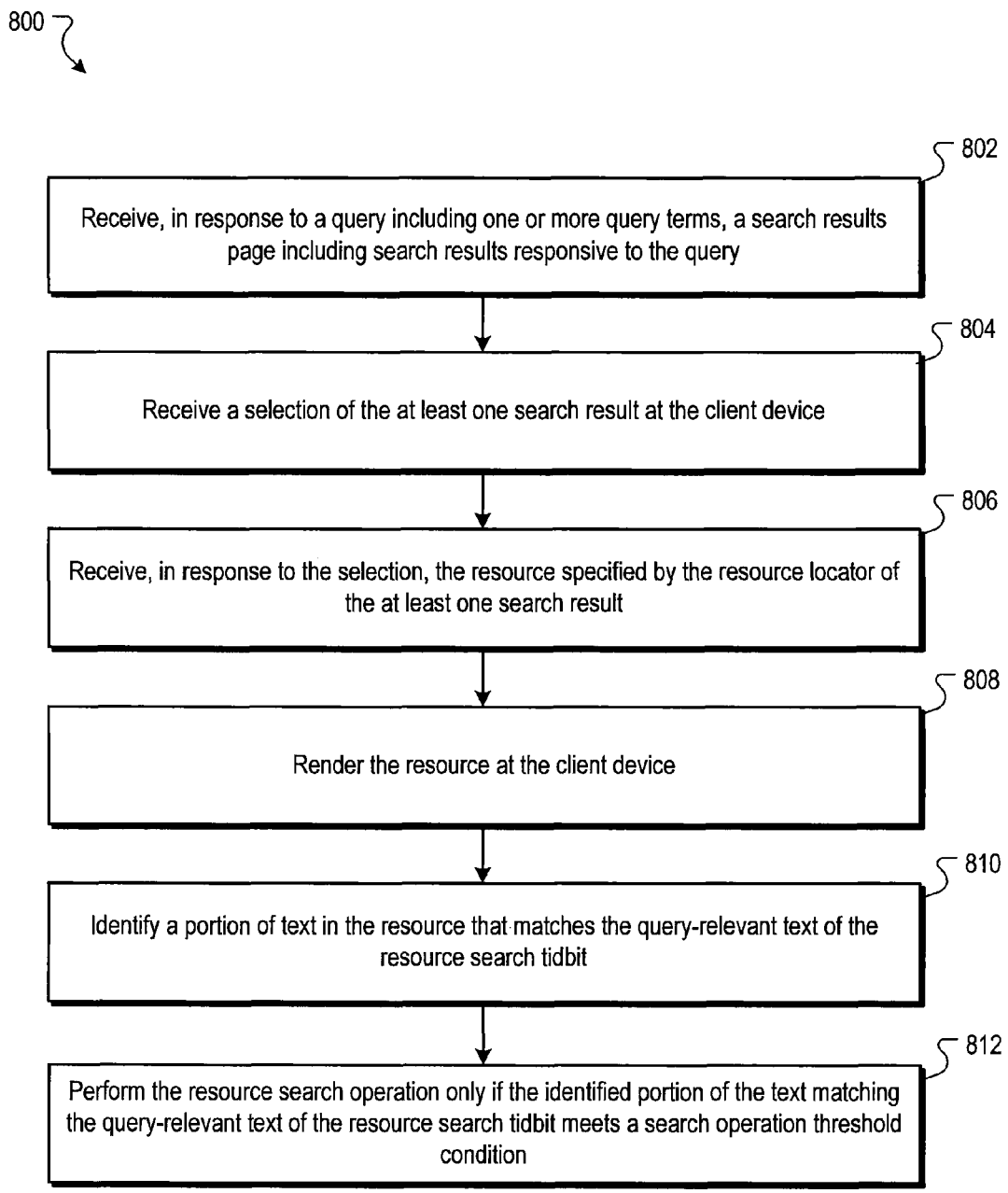
FIG. 8 is a flow diagram of an example process for performing a resource search operation.

FIG. 8 is a flow diagram of an example process 800 for performing a resource search operation. As an example, the client device 106 (described with reference to FIG. 1) can perform the steps of the process 800. More specifically, the process 800 can be executed, for example, by computer applications that are part of, our in communication with, Web browser applications or other Web search and content rendering applications running on a user's client device 106.

In response to a query including one or more query terms, a search results page including search results responsive to the query is received (802). Each search result includes a resource locator that specifies the location of a resource identified as being relevant to the query. At least one search result includes a resource search tidbit. The resource search tidbit is query-relevant text extracted from the resource. The resource search tidbit is eligible for a research search operation in response to the resource specified by the resource locator of the at least one search result being rendered on the client device. Referring to FIG. 1, for example, the search results page can be the web page 126 that displays the search results 111 provided by the search system 110. The search results 111 can include snippets from and links to resources 105 that the search system 110 identifies as responsive to the user's query 109. The search results 111 can be displayed or rendered within a graphical user interface on the screen of the user's client device 106. For example, if the user's query 109 is "pachinko 1975 Japan," then the search results page displayed as the web page 126 can include Web or Internet "hits" related to the query. As result, the user can see, within each of the search results 111, resource locators (e.g., links or URLs) for each resource 105, and snippets that can contain some or all of the individual query terms from the query 109.

A selection of the at least one search result is received at the client device (804). For example, from the search results 111 displayed on the user's client device 106, the user can select one of the individual search results 111. Continuing with the current example, the user can select a particular search result, such as a search result 111 corresponding to the history of pachinko games in Japan. The user's selection of the particular search result 111, for example, can cause the Web browser application to obtain the URL (or other resource locator) that is associated with or embedded within the search result 111.

In response to the selection, the resource specified by the resource locator of the at least one search result is received (806). For example, using the URL of the selected search result 111, the Web browser application can access the corresponding resource 105. Access can occur, for example, over the network 102, using the URL of the resource 105.

The resource is rendered at the client device (808). As an example, the resource 105 can be displayed within the user's Web browser, such as to display the Web page that provides a history of pachinko games in Japan.

A portion of text in the resource that matches the query-relevant text of the resource search tidbit is identified (810). As an example, referring to FIG. 1, an application on the client device 106 identifies query-relevant text 138 corresponding to the specific resource search tidbit 134.

The resource search operation is performed only if the identified portion of the text matching the query-relevant text of the resource search tidbit meets a search operation threshold condition (812). For example, in some implementations, certain threshold conditions must exist before the resource search operation is performed. Specifically, unless the query-relevant text 138 corresponding to a specific resource search tidbit 134 appears below the "fold" (e.g., a pre-determined number of pixels from the top of the display or outside of the current view port), the selection environment 132 is not displayed.

In some implementations, the selection environment 132 can display all resource search tidbits 134 no matter how many of the resource search tidbits' corresponding query-relevant text passages appear above or below the fold. In other implementations, the selection environment 132 displays only the resource search tidbits for which corresponding text passages are below the fold.

Figure 9:
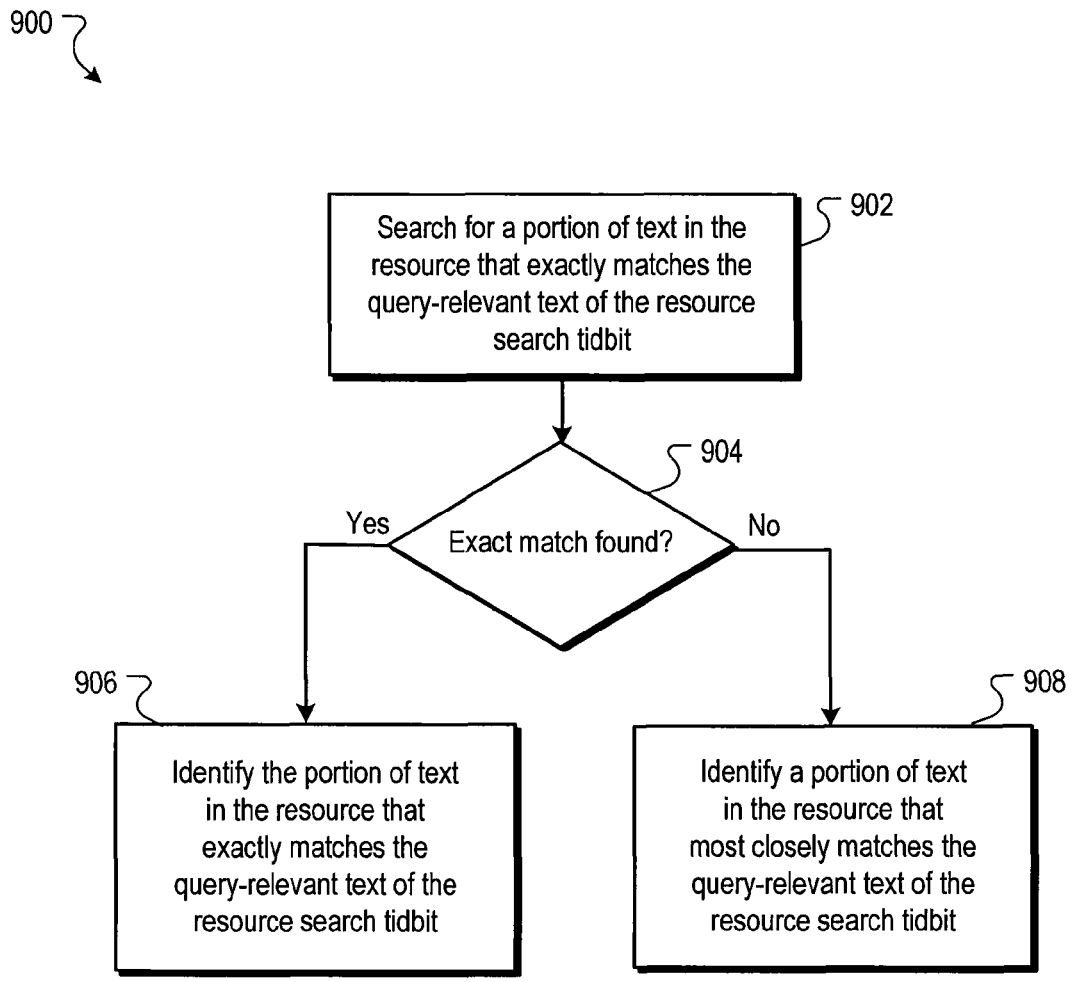
FIG. 9 is a flow diagram of an example process for determining whether a portion of text in a resource matches the query-relevant text of a resource search tidbit.

FIG. 9 is a flow diagram of an example process 900 for determining whether a portion of text in a resource matches the query-relevant text of a resource search tidbit. As an example, the client device 106 (described with reference to FIG. 1) can perform the steps of the process 900. More specifically, the process 900 can be executed, for example, by computer applications that are part of, or in communication with, Web browser applications or other Web search and content rendering applications running on a user's client device 106.

In some implementations, the resources that are processed by the search system 110 are cached resources, and the resources may have been updated by administrators or users after the resource is stored in a cache of the search system 110. Accordingly, the copy of the resource stored in the cache of the search system 110 may not exactly match the copy of the resource that is provided by the website hosting the resource. Accordingly, the client device, in some implementations, is configured to search for matching text based on an exact match and a closest match criteria.

A portion of text in the resource that exactly matches the query-relevant text of the resource search tidbit is searched for (902). For example, a Web browser application running on the client device 106 can search for query-relevant text in a resource 105 that matches all of the text in the resource search tidbit.

A determination is made whether an exact match is found (904). If an exact match is found, then the portion of text in the resource that exactly matches the text of the resource search tidbit is identified (906). The identification can be used to highlight the text on some way, such as to highlight the query-relevant text 138 in the resource 105. The query-relevant text 138 in this case can contain all of the query terms (e.g., all of the terms in "pachinko 1975 Japan").

If no exact match is found, then the portion of text in the resource that most closely matches the text of the resource search tidbit is identified (908). For example, in this case, the text identified in the resource 105 can include exact matches to most of the terms in the query 109 and close matches to the remaining terms. In some implementations, a portion of text with a minimum edit distance from the query-relevant text of the resource search tidbit relative to other portions of the text in the resource is identified as being the closest match. In some implementations, prefix matching can be used, such as to identify terms in the query-relevant text having the longest prefix match to terms in the resource search tidbit. In other implementations, postfix matching can be used, such as to identify terms in the query-relevant text having the longest postfix match to terms in the resource search tidbit. Other types of matching can also be used, e.g., longest string matching, etc.

Figure 10:
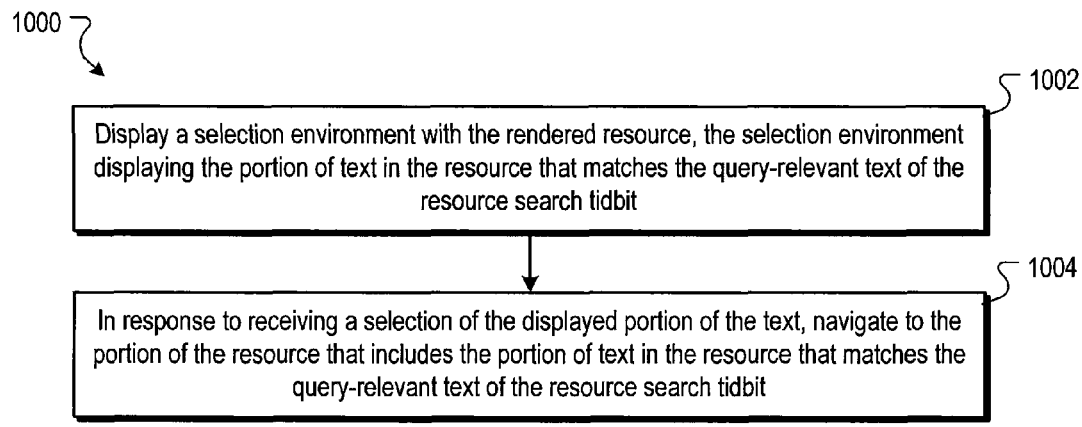
FIG. 10 is a flow diagram of an example process for navigating to a portion of a resource in response to selecting a resource search tidbit.

FIG. 10 is a flow diagram of an example process 1000 for navigating to a portion of a resource in response to selecting a resource search tidbit. As an example, the client device 106 (described with reference to FIG. 1) can perform the steps of the process 1000. More specifically, the process 1000 can be executed, for example, by computer applications that are part of, our in communication with, Web browser applications or other Web search and content rendering applications running on a user's client device 106.

A selection environment is displayed with the rendered resource, the selection environment displaying the portion of text in the resource that matches the query-relevant text of the resource search tidbit (1002). For example, referring to FIG. 1, when the Web browser executing on the user's client device 106 displays the page 128 corresponding to the resource 105, the selection environment 132 can also be displayed. Specifically, the page 128 can be a web page related to pachinko games, and the selection environment 132 can include one or more resource search tidbits 134 corresponding to query-relevant text portions in the resource 105 that are related to the query terms of the query 109 (e.g. "pachinko 1975 Japan").

In response to receiving a selection of the displayed portion of the text, navigation occurs to the portion of the resource that includes the portion of text in the resource that matches the query-relevant text of the resource search tidbit (1004). For example, if the user selects a particular resource search tidbit 134, such as one containing the tidbit "Japan sent boatloads of reconditioned pachinkos to the US in 1975," then the user's Web browser can navigate to that portion of the resource 105 that contains that text. Specifically, the Web page can automatically scroll to the passage of interest as shown in FIG. 1 and indicated by an updated display of the page 128 and a new position of the scroll bars 130.

Figure 11:
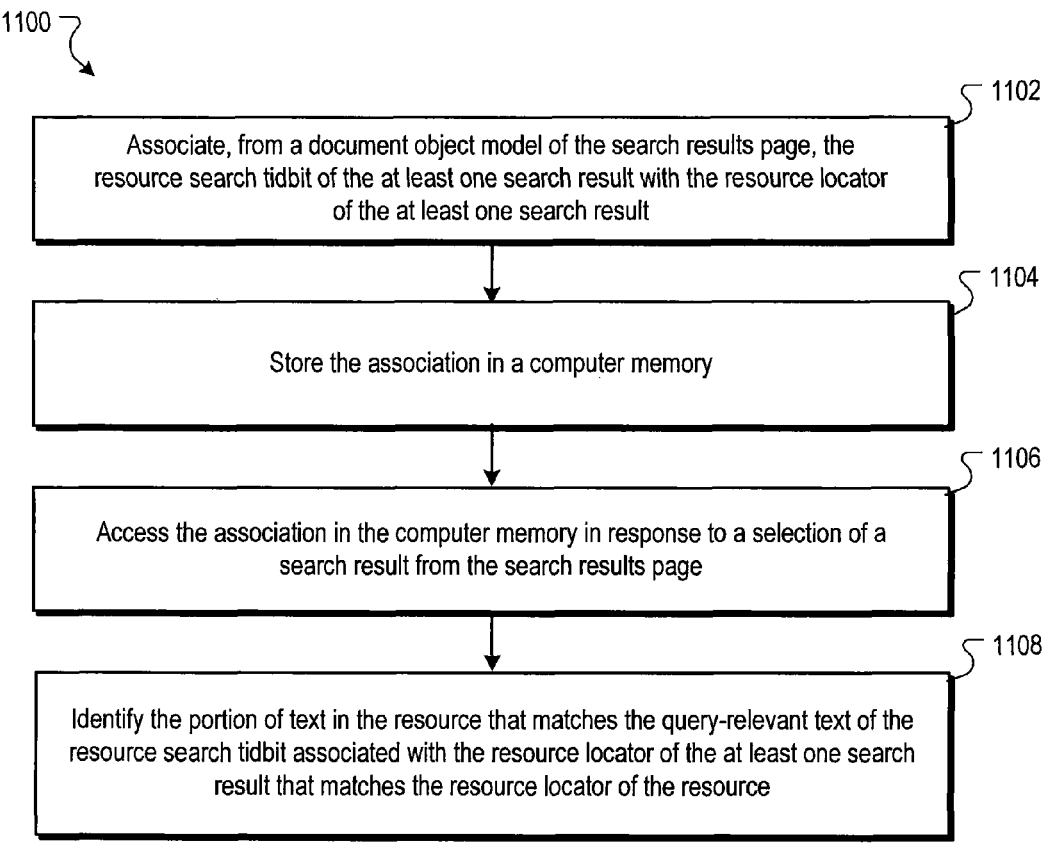
FIG. 11 is a flow diagram of performing a resource search operation using an association of resource locators and resource search tidbits.

FIG. 11 is a flow diagram of an example process 1100 for performing a resource search operation using an associating of resource locators and resource search tidbits. As an example, the client device 106 (described with reference to FIG. 1) can perform the steps of the process 1100. More specifically, the process 1100 can be executed, for example, by computer applications that are part of, our in communication with, Web browser applications or other Web search and content rendering applications running on a user's client device 106.

From a document object model of the search results page, the resource search tidbit of the at least one search result is associated with the resource locator of the at least one search result (1102). For example, if the DOM representation of a search results page is in the form of a tree of node objects, the nodes of the tree can include the association of the resource search tidbit to a resource locator in a search result.

The association is stored in a computer memory (1104), and the association is accessed in the computer memory in response to a selection of a search result from the search results page (1106). For example, when the user selects one of the search results 111 from the Web page 126, the Web browser executing on the user's client device 106 can access the association of the resource search tidbits and the URL corresponding to the selected search result.

The portion of text in the resource that matches the query-relevant text of the resource search tidbit associated with the resource locator of the at least one search result that matches the resource locator of the resource is identified (1108).

In some implementations, some of the processing described above as occurring at the client device 106 can instead occur at the server. For example, the search system 110 can perform most or all of the processing needed to determine eligibility of resource search tidbits.

In some implementations, the selection environment 132 can always be displayed regardless of whether the query-relevant text of the resource 105 already appears on the screen.

In some implementations, in order to manage large numbers of (e.g., more than 1 to 5) resource search tidbits (RSTs) in the selection environment 132, a scroll bar can be added to allow the user to position to an RST of interest, such as one further down the list.

In some implementations, additional tools can be added to the selection environment 132, such as a tool to check off passages that have already been read. In some implementations, the user can be provided with options to hide selected RSTs, such a RSTs most associated with a specific query term in which the user is no longer interested in seeing associated RSTs. In some implementations, user options can be provided to allow the RSTs to be sorted in specific ways (e.g., by one or more query terms). In some implementations, a search feature can be added to the selection environment 132 that allows the user, for example, to search for specific text strings within the collection of RSTs.

In some implementations, automatic highlighting can occur on the portions of text in a resource that match the text of the resource search tidbit, regardless of whether the resource search tidbit meets a search operation threshold condition. For example, the text can be highlighted in light yellow upon initial display of the resource. If a selection environment is displayed, and if the user then selects the RST associated with the query-relevant text, the highlighting can be changed, for example, to a strong yellow.

In some implementations, once a user is thought to have read or reviewed a particular passage, highlighting can be changed to an off color, such as by changing the initially-highlighted in yellow text to violet or some other non-yellow highlighting color. In this way, the user can be informed of where he or she has already been on the Web page.

Although the examples above describe providing resource search tidbits that include query-relevant text, other types of data can be used to identify text for a resource search operation. For example, in some implementations, the server system 110 can provide a byte offset and byte length tuple that identifies the distance from the start of the resource, in bytes, of a tidbit that is of a size equal to the byte length. Alternatively, other offset references can also be used, e.g., a paragraph number and/or sentence number. In these implementations, the matching operations at the client side can be changed accordingly.

In other implementations, the client device can request resource search tidbits for a resource from the search system 110 asynchronously, e.g., in response to selecting a resource from a search result. The search system 110 can then perform the resource search tidbit operations described above for only that resource, and provide the identified resource search tidbits to the client device for processing. This implementation reduces processing load on the search system 110.

Although the system above is described in the context of a server and a client device, in some implementations, some of the server operations can be performed on the client device. For example, when receiving search results, the browser application can treat the snippet as a default resource search tidbit, and can perform the eligibility operations, matching operations, highlighting operations, and search environment related operations described above using the snippet as input.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
receiving a query, the query including one or more query terms;
receiving, for each of a plurality of resources identified as being relevant to the query, one or more tidbits, each tidbit being query-relevant text extracted from the resource;
for each tidbit extracted from each resource:
determining whether the tidbit is eligible for a resource search operation that occurs in response to the resource being rendered on a client device; and
in response to determining that the tidbit is eligible for a resource search operation, marking the tidbit as being a resource search tidbit;
providing to a client device, for each of the plurality of resources, a corresponding search result responsive to the query, each search result including a resource locator that specifies the location of the resource, wherein at least one search result includes resource search tidbits, each of which are not rendered on the client device as part of the search result;
wherein a selection of the at least one search result at the client device causes the client device to perform operations comprising:
rendering the resource referenced by the search result;
selecting only resource search tidbits for which a portion of text in the resource that matches query-relevant text of a resource search tidbit is not within a viewport of the client device when the resource is initially rendered on the client device; and
only for the selected resource search tidbits performing a resource search operation comprising displaying with the rendered resource a selection environment that includes a respective selection environment option for each selected resource search tidbit, and wherein a selection of each respective selection environment option causes the client device to navigate to a portion of resource that includes the identified portion of the text matching the respectively selected resource search tidbit.

2. The method of claim 1, wherein:
each search result includes a snippet, the snippet being query-relevant text extracted from the resource specified by the resource locator of the search result, and the snippet is rendered on the client device as part of the search result; and
the query-relevant text of the resource search tidbit included in the search result is a subset of the query-relevant text of the snippet included in the search result.

3. The method of claim 1, wherein:
each search result includes a snippet, the snippet being query-relevant text extracted from the resource specified by the resource locator of the search result, and the snippet is rendered on the client device as part of the search result;
the query-relevant text of the resource search tidbit included in the search result is independent of the query-relevant text of the snippet included in the search result.

4. The method of claim 1, wherein determining whether the tidbit is eligible for a resource search operation that occurs in response to the resource being rendered on a client device comprises:
identifying query terms in a title section of the resource;
identifying query terms in the tidbit; and
determining that the tidbit is eligible for the resource search operation if there is at least one query term identified in the tidbit that is not identified in the title section of the resource.

5. The method of claim 4, wherein:
identifying query terms in a title section of the resource comprises identifying query terms in the title section of the resources and synonyms of the query terms identified in the title section;

identifying query terms in the tidbit comprises identifying query terms in the tidbit and synonyms of the query terms in the tidbit as identified query terms; and determining that the tidbit is eligible for the resource search operation comprises determining that the tidbit is eligible for the resource search operation if there is at least one identified query term in the tidbit that is not identified in the title section of the resource.

6. The method of claim 1, wherein determining whether the tidbit is eligible for a resource search operation that occurs in response to the resource being rendered on a client device comprises:

identifying query terms in a title section of the resource and the resource locator specifying the location of the resource;

identifying query terms in the tidbit; and determining that the tidbit is eligible for the resource search operation if there is at least one query term identified in the tidbit that is not identified in either of the title section of the resource and the resource locator specifying the location of the resource.

7. The method of claim 1, wherein determining whether the tidbit is eligible for a resource search operation that occurs in response to the resource being rendered on a client device comprises determining that the tidbit is eligible for the resource search operation if all of the query terms are included in the tidbit.

8. The method of claim 1, wherein the query-relevant text of each tidbit is a contiguous portion of text extracted from the resource.

9. A computer-implemented method performed by a client device, the method comprising:

receiving, in response to a query including one or more query terms, a search results page including search results responsive to the query, each search result including a resource locator that specifies the location of a resource identified as being relevant to the query, and wherein at least one search result includes resource search tidbits, each of the resource search tidbits being query-relevant text extracted from the resource and eligible for a research search operation in response to the resource specified by the resource locator of the at least one search result being rendered on the client device;

receiving a selection of the at least one search result at the client device;

receiving, in response to the selection, the resource specified by the resource locator of the at least one search result;

rendering the resource at the client device;

for each resource search tidbit:

identifying a portion of text in the resource that matches the query-relevant text of the resource search tidbit; and determining whether the identified portion of the text matching the query-relevant text of the resource search tidbit is not within a viewport of the client device when the resource is initially rendered on the client device; and only for each resource search tidbit determined to not be within the viewport of the client device when the resource is initially rendered on the client device, performing a resource search operation comprising displaying with the rendered resource a selection environment that includes a selection environment option that corresponds to the resource search tidbit, and wherein a selection of the selection environment option causes the client device to navigate to a portion of resource that includes the identified portion of the text matching the resource search tidbit.

10. The method of claim 9, wherein identifying a portion of text in the resource that matches the query-relevant text of the resource search tidbit comprises:

searching for a portion of text in the resource that exactly matches the query-relevant text of the resource search tidbit;

if a portion of text in the resource that exactly matches the query-relevant text of the resource search tidbit is found from the search, identifying the portion of text as matching the query-relevant text of the resource search tidbit; and if no portion of text in the resource that exactly matches the query-relevant text of the resource search tidbit is found from the search, identifying a portion of text in the resource that most closely matches the query-relevant text of the resource tidbit as matching the query-relevant text of the resource search tidbit.

11. The method of claim 10, wherein identifying the portion of text in the resource that most closely matches the query-relevant text of the resource tidbit comprises identifying the portion of the text in the resource that has a minimum edit distance from the query-relevant text of the resource search tidbit relative to other portions of the text in the resource.

12. The method of claim 9, wherein each resource search tidbit includes at least one query term that is not included in a title section of the resource.

13. The method of claim 9, wherein each resource search tidbit includes at least one query term that is not included in either of a title section of the resource and the resource locator specifying the location of the resource.

14. The method of claim 9, further comprising automatically highlighting the portion of text in the resource that matches the query-relevant text of the resource search tidbit in response to navigating to the portion of the text.

15. The method of claim 9, further comprising:

associating, from a document object model of the search results page, the resource search tidbit of the at least one search result with the resource locator of the at least one search result;

storing the association in a computer memory; and accessing the association in the computer memory in response to a selection of a search result from the search results page;

wherein identifying the portion of text in the resource that matches the query-relevant text of the resource search tidbit comprises identifying the portion of text in the resource that matches the query-relevant text of the resource search tidbit associated with the resource locator of the at least one search result that matches the resource locator of the resource.

16. The method of claim 9, wherein:

each search result includes a snippet, the snippet being query-relevant text extracted from the resource specified by the resource locator of the search result, and the snippet is rendered on the client device as part of the search result; and the query-relevant text of the resource search tidbit included in the at least one search result is a subset of the query-relevant text of the snippet included in the at least one search result.

17. The method of claim 9, wherein:

each search result includes a snippet, the snippet being query-relevant text extracted from the resource specified by the resource locator of the search result, and the snippet is rendered on the client device as part of the search result;

the query-relevant text of the resource search tidbit included in the at least one search result is independent of the query-relevant text of the snippet included in the at least one search result.

18. A system, comprising:

a data processing apparatus comprising one or more computers; and a data store in data communication with the data processing apparatus and storing instructions executable by a data processing apparatus and that upon execution cause the data processing apparatus to perform operations comprising:

receiving a query, the query including one or more query terms;

receiving, for each of a plurality of resources identified as being relevant to the query, one or more tidbits, each tidbit being query-relevant text extracted from the resource;

for each tidbit extracted from each resource:
    determining whether the tidbit is eligible for a resource search operation that occurs in response to the resource being rendered on a client device; and
    in response to determining that the tidbit is eligible for a resource search operation, marking the tidbit as being a resource search tidbit;

providing to a client device, for each of the plurality of resources, a corresponding search result responsive to the query, each search result including a resource locator that specifies the location of the resource, and wherein at least one search result includes resource search tidbits, each of which are not rendered on the client device as part of the search result;

wherein a selection of the at least one search result at the client device causes the client device to perform operations comprising:
    rendering the resource referenced by the search result;
    selecting only resource search tidbits for which a portion of text in the resource that matches query-relevant text of a resource search tidbit is not within a viewport of the client device when the resource is initially rendered on the client device; and only for the selected resource search tidbits performing a resource search operation comprising, displaying with the rendered resource a selection environment that includes a respective selection environment option for each selected resource search tidbit, and wherein a selection of each respective selection environment option causes the client device to navigate to a portion of resource that includes the identified portion of the text matching the respectively selected resource search tidbit.

19. A system, comprising:

a data processing apparatus comprising one or more computers; and a data store in data communication with the data processing apparatus and storing instructions executable by a data processing apparatus and that upon execution cause the data processing apparatus to perform operations comprising:

receiving, in response to a query including one or more query terms, a search results page including search results responsive to the query, each search result including a resource locator that specifies the location of a resource identified as being relevant to the query, and wherein at least one search result includes a resource search tidbit, the resource search tidbit being query-relevant text extracted from the resource and eligible for a research search operation in response to the resource specified by the resource locator of the at least one search result being rendered on the client device;

receiving a selection of the at least one search result at the client device;

receiving, in response to the selection, the resource specified by the resource locator of the at least one search result;

rendering the resource at the client device;

for each resource search tidbit:
    identifying a portion of text in the resource that matches the query-relevant text of the resource search tidbit; and
    determining whether the identified portion of the text matching the query-relevant text of the resource search tidbit is not within a viewport of the client device when the resource is initially rendered on the client device; and only for each resource search tidbit determined to not be within the viewport of the client device when the resource is initially rendered on the client device, performing a resource search operation comprising displaying with the rendered resource a selection environment that includes a selection environment option that corresponds to the resource search tidbit, and wherein a selection of the selection environment option causes the client device to navigate to a portion of resource that includes the identified portion of the text matching the resource search tidbit.

20. Software stored on a non-transitory computer readable storage device comprising instructions executable by a data processing apparatus and that upon execution cause the data processing apparatus to perform operations comprising:

receiving, in response to a query including one or more query terms, a search results page including search results responsive to the query, each search result including a resource locator that specifies the location of a resource identified as being relevant to the query, and wherein at least one search result includes a resource search tidbit, the resource search tidbit being query-relevant text extracted from the resource and eligible for a research search operation in response to the resource specified by the resource locator of the at least one search result being rendered on the client device;

receiving a selection of the at least one search result at the client device;

receiving, in response to the selection, the resource specified by the resource locator of the at least one search result;

rendering the resource at the client device;

for each resource search tidbit:
identifying a portion of text in the resource that matches the query-relevant text of the resource search tidbit; and
determining whether the identified portion of the text matching the query-relevant text of the resource search tidbit is not within a viewport of the client device when the resource is initially rendered on the client device; and
only for each resource search tidbit determined to not be within the viewport of the client device when the resource is initially rendered on the client device, performing a resource search operation comprising displaying with the rendered resource a selection environment that includes a selection environment option that corresponds to the resource search tidbit, and wherein a selection of the selection environment option causes the client device to navigate to a portion of resource that includes the identified portion of the text matching the resource search tidbit.

* * * * *